(12) United States Patent
Murphy et al.

(10) Patent No.: US 7,120,324 B2
(45) Date of Patent: Oct. 10, 2006

(54) INTRUSION DETECTION SYSTEM FOR USE ON AN OPTICAL FIBER USING A TRANSLATOR OF TRANSMITTED DATA FOR OPTIMUM MONITORING CONDITIONS

(75) Inventors: Cary R. Murphy, Hickory, NC (US); Mark K. Bridges, Hickory, NC (US); David E. Vokey, Sidney (CA)

(73) Assignee: Network Integrity Systems Inc., Conover, NC (US)

( * ) Notice: Subject to any disclaimer, the term of this patent is extended or adjusted under 35 U.S.C. 154(b) by 0 days.

(21) Appl. No.: 11/137,776

(22) Filed: May 26, 2005

(65) Prior Publication Data

US 2006/0002649 A1    Jan. 5, 2006

Related U.S. Application Data

(63) Continuation-in-part of application No. PCT/US04/021268, filed on Jul. 2, 2004.

(60) Provisional application No. 60/488,374, filed on Jul. 18, 2003.

(51) Int. Cl.
*G02B 6/00* (2006.01)
*H04B 17/00* (2006.01)
*H04B 10/00* (2006.01)

(52) U.S. Cl. .............................. 385/12; 398/20; 398/28; 398/33

(58) Field of Classification Search ................... 398/20, 398/21, 28, 29, 31, 33; 385/12, 13
See application file for complete search history.

(56) References Cited

U.S. PATENT DOCUMENTS

| | | | | |
|---|---|---|---|---|
| 4,297,684 A | * | 10/1981 | Butter | 340/557 |
| 4,843,233 A | * | 6/1989 | Jeunhomme | 250/227.19 |
| 5,680,104 A | * | 10/1997 | Slemon et al. | 340/568.2 |
| 6,819,849 B1 | * | 11/2004 | Tangonan et al. | 385/126 |
| 6,937,151 B1 | * | 8/2005 | Tapanes | 340/550 |
| 2001/0024162 A1 | * | 9/2001 | Lee | 340/555 |
| 2003/0035615 A1 | * | 2/2003 | Foltzer | 385/24 |

FOREIGN PATENT DOCUMENTS

| | | |
|---|---|---|
| WO | WO 96/08695 | 3/1996 |
| WO | WO 00/37925 | 6/2000 |
| WO | WO 00/67400 | 11/2000 |

* cited by examiner

*Primary Examiner*—Michelle Connelly-Cushwa
(74) *Attorney, Agent, or Firm*—Adrian D. Battison; Michael R. Williams; Ryan W. Dupuis

(57) ABSTRACT

A method and system of intrusion detection system for a multimode fiber optic cable. A light signal is launched into the cable fiber to establish a narrow spectral width, underfilled non-uniform mode field power distribution in the cable. A small portion of the higher order signal modes arriving at the remote end of the cable is sampled and monitored for transient changes in the mode field power distribution. The power distribution changes with physical disturbance of the cable. When those changes are detected as being characteristic of fiber intrusion, the system activates an alarm. This method can sense and alarm any attempt to access the optical fibers in a fiber optic communication cable. In preferred embodiments, the active signal of a multimode optical fiber is monitored for both signal degradation and transient power disturbance patterns that could indicate fiber damage or physical intrusion. A translator can be provided in an existing optical fiber system in which the data signals are translated in wavelength and/or launch conditions to optimize the monitoring signals in an otherwise non-optimized system.

18 Claims, 4 Drawing Sheets

INTRUSION DETECTION SYSTEM FOR USE ON AN OPTICAL FIBER USING A TRANSLATOR OF TRANSMITTED DATA FOR OPTIMUM MONITORING CONDITIONS

This application is a continuation-in-part application of PCT Application PCT/US2004/021268 filed 2 Jul. 2004.

This application claims the benefit of the priority date under 35U.S.C. 119 from Provisional Application 60/488,374 filed 18 Jul. 2003.

Reference is made to a co-pending application filed on the same date as this application by the same inventors, which is application Ser. No. 11/137,777 entitled AN INTRUSION DETECTION SYSTEM FOR USE ON MULTI-MODE OPTICAL FIBER USING AN OFFSET LAUNCH AND TAP COUPLER.

FIELD OF THE INVENTION

The present invention relates to the detection of physical intrusion into a optical fiber.

BACKGROUND OF THE INVENTION

Gigabit Ethernet multimode fiber optic backbone cables are being deployed to connect sections of high-speed networks together. To secure these high-speed networks, software based Intrusion Detection Systems (IDSs) have been introduced. These systems capture and analyze all packets for unusual patterns that point to an intrusion. However, this adds to the complexity of the network. Current IDSs are hampered by a Base-Rate Fallacy limitation, which is the inability to suppress false alarms. Additionally, software-based IDSs do not protect against passive optical fiber tapping, which can go undetected by the network hardware.

It is well known, by those skilled in the technology, that an optical fiber can easily be tapped and the data stream monitored. One relatively simple non-interruptive tapping method involves placing a bend coupler on the fiber to be tapped. A controlled bend of a critical radius is placed on the fiber. This causes a small spatial distortion in the core/cladding guiding properties and a fraction of the light escapes the fiber. A detector is located at the point of the light leakage and the data steam intercepted. Bend couplers typically introduce a loss of light power of up to 1 dB or more. Power measuring intrusion detection systems are available to detect this loss in optical power and provide warning alarms.

With care and skill, more insidious methods are available to the skilled intruder. With a sufficiently sensitive receiver and care in preparation, a fiber can be successfully tapped without introducing a telltale bend in the optical fiber. A successful tap can be achieved by carefully removing a short length, in the order of a few centimeters or inches of the protective outer coating of the target fiber and polishing the outer cladding down by a few microns to form a flat coupling region. A cladding-to-cladding coupling is then made using a special intercept fiber. This method intercepts a portion of the weak but measurable cladding mode power that propagates in the tapped fiber. In this case, the intercepted light, which may be detected by a sensitive receiver, can easily be 20 or 30 dB down from the power in the fiber core. This results in a loss of received optical power of only 0.04 or 0.004 dBm and is impossible to detect reliably by power measurement methods. The present invention addresses the limitations of current power loss detection methods and can detect intrusion activity before any optical power loss occurs.

Previous systems for detecting intrusions in multi-mode fibers are shown in PCT published applications WO 96/08695 published 21 Mar. 1996, WO 00/37925 published 29 Jun. 2000 and WO 00/67400 published 9 Nov. 2000 all assigned to Future Fibre Technologies of Australia.

SUMMARY OF THE INVENTION

It is one object of the present invention to provide a method of detecting movement of a fiber which may indicate a potential intrusion.

According to the invention there is provided a method for monitoring movement of an optical fiber comprising:

providing a optical fiber for monitoring having first and second ends;

providing an input signal from a source containing data;

detecting movement of the fiber along the length thereof by:

injecting light pulses into one end of the optical fiber;

detecting at a position on the fiber a series of received light signals which have been transmitted along the fiber as a result of the injected light pulses;

comparing at least some of the received light signals relative to data obtained from previously received ones of the received light signals to detect changes in the received light signals relative to the previously received light signals;

analyzing the changes to determine any changes which are indicative of movement of the optical fiber causing at a portion thereof along the length thereof;

and generating an alarm in response to the detection of any such changes which are indicative of movement;

wherein there is provided a translator which receives the input signal from the source and which translates the signal into the light pulses which are optimized in wavelength and/or launch conditions for injection into the optical fiber such that the received light signals are optimized for monitoring of movement of the optical fiber.

Preferably the translator changes wavelength.

Preferably the fiber to be monitored is a multi-mode fiber and the translator provides an offset launch of the signals which are offset from the center of a core of the optical fiber so as to establish a non-uniform mode field power distribution in the cable.

In the alternative, the fiber to be monitored may be a single made fiber and the techniques for monitoring the fiber may be of the type shown and described in application Ser. No. 11/152,681 co-pending with this application and filed on Jun. 15, 2005, the disclosure of which is incorporated herein by reference.

Preferably the received light signals are obtained by capturing a portion of higher order signal modes arriving at a distal end of the cable and wherein the captured portion is monitored for transient changes in the mode field power distribution that are characteristic of cable handling.

Preferably the translator includes a single mode fiber which is coupled to the multimode optical fiber at the proximal end at a position which is offset from the center of the core.

Preferably the light signal is non-divergent.

Preferably the light signal establishes a narrow spectral width, under-filled, non-uniform mode field power distribution in the multimode optical fiber.

Preferably the higher order signal modes at the distal end are captured by a tap coupler.

Preferably the tap coupler taps off a small portion of the higher order modes for the sample signal leaving a larger separate signal forming a bulk optical launch distribution.

Preferably the tap coupler is made by a cladding-to-cladding fusion which provides a predetermined tap-coupling ratio.

Preferably the larger separate signal is delivered to a second detector circuit where an absolute throughput power of the launched light signal is calculated therefrom.

Preferably there is provided a microprocessor which compares the response in the sample signal and the separate larger signal and acts to calculate any power change as well as changes in modal power distribution such that excessive power change levels produce an alarm indication.

Preferably the microprocessor is arranged such that a significant change in the sample signal and the separate larger signal is used to indicate a problem with the source or the optical fiber while a transient and steady state change in the high order mode power distribution from the sample signal only would is used to provide an indication of an intrusion attempt.

Preferably the translator comprises an optical receiver for receiving the input signal from an optical fiber and an optical transmitter for transmitting the translated optical signals.

Preferably the optical receiver is arranged to provide an electrical output containing the data and the optical transmitter is arranged to generate the translated optical signals from the electrical output.

Preferably there is provided a second translator at the second end which is symmetrical to the translator and translates the received light signals back to a signal compatible with the input signal.

Preferably the translator and the second translator form a system for adding to an existing network including the optical fiber to be modified so as to optimize the existing network for monitoring of the fiber.

Preferably the output of the monitored fiber is split into a data signal and a monitoring signal on a multi-mode fiber portion and wherein the tap coupler is located at the multi-mode fiber portion and the larger separate signal therefrom is delivered to a second detector circuit where an absolute throughput power of the launched light signal is calculated therefrom.

This method can sense and alarm any attempt to access the optical fibers in a fiber optic communication cable. The preferred embodiments of the method monitor the active signal of a multimode optical fiber strand for both signal degradation and transient power disturbance patterns that could indicate fiber damage or physical intrusion.

The currently preferred system uses the light output signal from a laser transmitter that is coupled to the multimode fiber in an offset launch alignment. At the distal, receive end of the link, a small percentage of the optical signal is sampled using a specially constructed optic coupler which captures a portion of the higher order mode power. An optical receiver detects the sampled signal and the modal power distribution is monitored for changes. Mechanical disturbances such as handling of the fiber cable cause shifts in the mode power distribution that are detected by the system, which signals a possible intrusion attempt before an actual tap occurs.

Using adaptive filtering, normal background disturbances from heating/cooling systems, motors, fans and other building systems can be learned and filtered out. This will allow maximum sensitivity to intrusion attempt signatures while minimizing the probability of false alarm events. The design objective is to identify intrusion attempts while the attack is still at the outer layer of the cable structure. This will allow for rapid location and interception of any intruder.

BRIEF DESCRIPTION OF THE DRAWINGS

In the accompanying drawings, which illustrate exemplary embodiments of the present invention.

DETAILED DESCRIPTION

Figure 1:
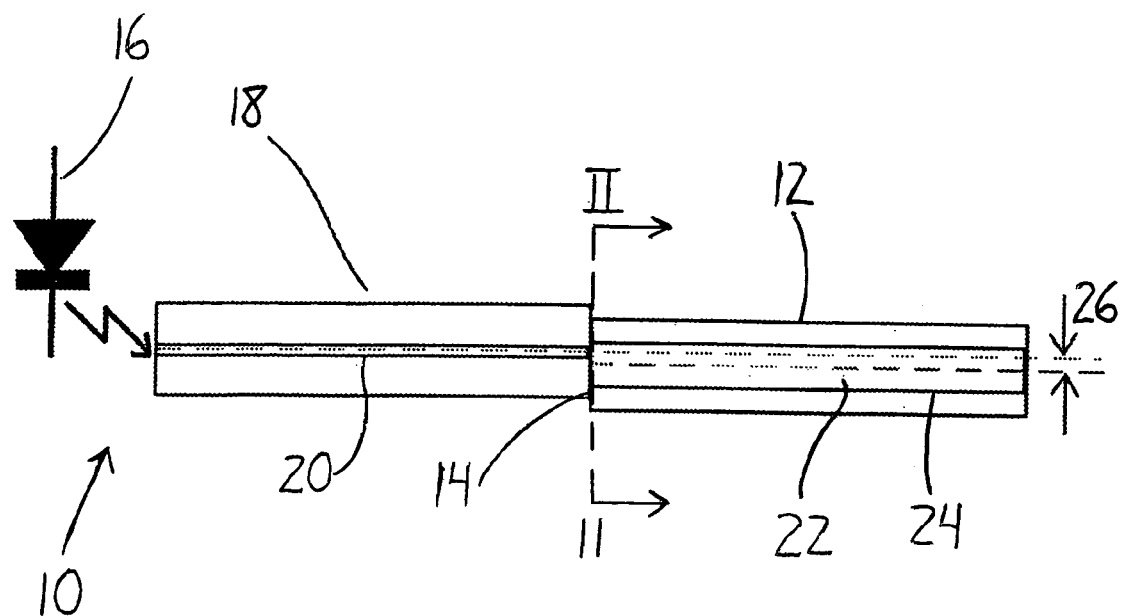
FIG. 1 is a longitudinal cross section showing an offset launch arrangement including a single mode fiber connected to a multimode fiber to be monitored for use in a system according to the present invention.
Figure 2:
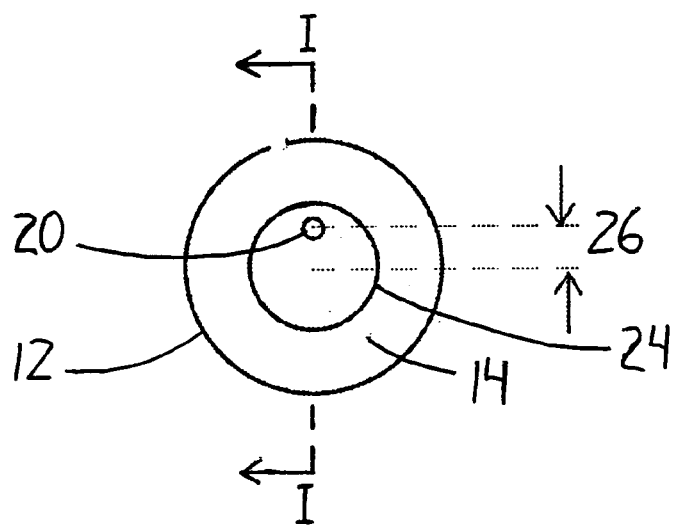
FIG. 2 is a transverse cross section of the fibers of FIG. 1.

Referring to the accompanying drawings, and particularly to FIGS. 1 and 2, a transmitter 10 is illustrated for setting up a narrow spectral width, under-filled, non-uniform mode field power distribution in a multimode optical fiber 12. With this type of mode field, the power distribution in the higher order modes changes with physical disturbance of the fiber, despite the absence of any power loss caused by the disturbance.

The non-uniform high order mode field may be set up in the multimode fiber 12 by illuminating the proximal (near) or transmit end 14 of the fiber with a point source of light that is offset from the center of the optical fiber core. This can be accomplished by a using a laser, optical tenses and positioning mechanics. In the illustrated embodiment, however, this is accomplished more simply by launching a laser 16 into a short length of single mode fiber 18 spliced to the multimode fiber with the center of its core 20 offset from the center 22 of the core 24 of the multimode fiber 12 by a fixed offset 26. For typical multimode fibers with either a 50 or 62.5 micron core, the single mode fiber, with a core size of approximately 10 microns, is spliced to the multimode fiber with a micron center-to-center offset which is optimized for maximum sensitivity (typically 5 to 20 micron offset).

Figure 3:
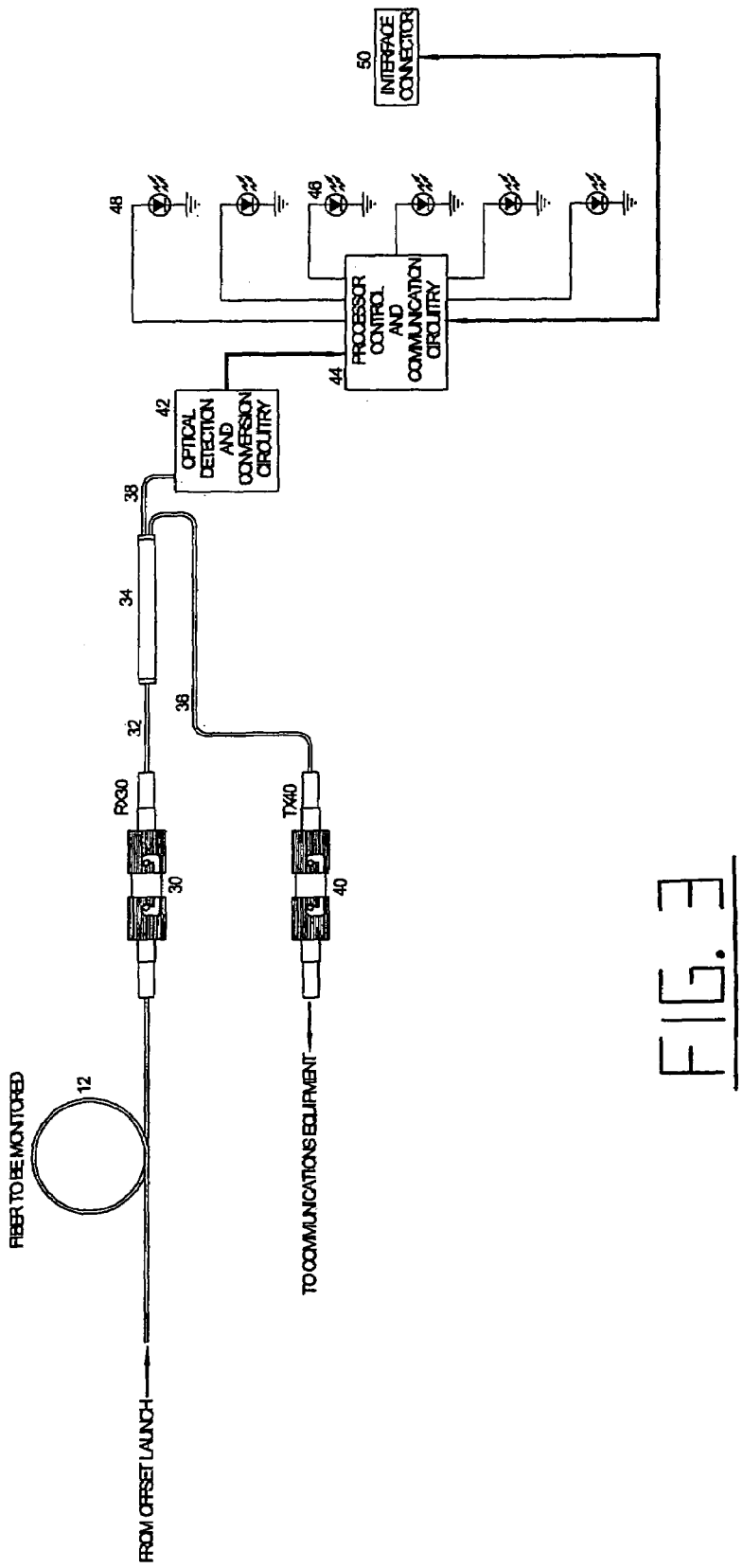
FIG. 3 is a block diagram of the receive end of the fiber to be monitored and a receiver portion of an intrusion detection system according to the present invention.

Referring more particularly to FIG. 3, at its distal (remote) or receive end (FIG. 1) the multimode optical fiber 12 is connected to a connector 30, the receive port $RX_{30}$ of which delivers the incoming signal from the fiber to the input 32 of a high order mode coupler 34. The coupler taps off a small portion of the higher order modes and returns the remaining optical power to an output port 36. Handling of the fiber cable will cause a local mechanical disturbance to the fiber. This mechanical disturbance, while not introducing detectable macro or micro bending losses, causes the power distribution in the mode pattern to change. This in turn results in a change of the coupling efficiency of the high order mode coupler and a variation in the optical power at a coupler output 38. The resultant optical signal is proportional in amplitude to the disturbing forces.

The high order mode coupler 34 can be made by a cladding-to-cladding fusion while measuring the tap-coupling ratio during the fusing process using an offset launch source as described.

The main portion of the optical signal is brought from coupler output 36 to the transmit port $TX_{40}$ of an optical connector 40 and is available for a communication or data receiver when active fiber monitoring is employed. The sampled output 38 of the mode coupler is forwarded to a detector and conversion circuit 42 where the optical signal is detected by a photo diode and the resulting electrical output converted from an analog to a digital signal. The digital signal is forwarded to a microprocessor control and communications assembly 44 where the signal is filtered to eliminate normal environmental background noise. The filtered signal is then analyzed for transient signatures and level changes that are characteristic of cable and fiber handling. At a pre-set disturbance level the assembly activates an alarm response. An alarm LED 46 is illuminated on a system status panel 48 and an alarm signal is output to an interface connector 50 for remote alarm reporting.

In the case of active fiber monitoring, where live traffic is carried on the monitored fiber, the laser source 16 can be modulated by a data stream and the output at the far end of the optical path coupled to a data receiver via the output connector 40.

Figure 4:
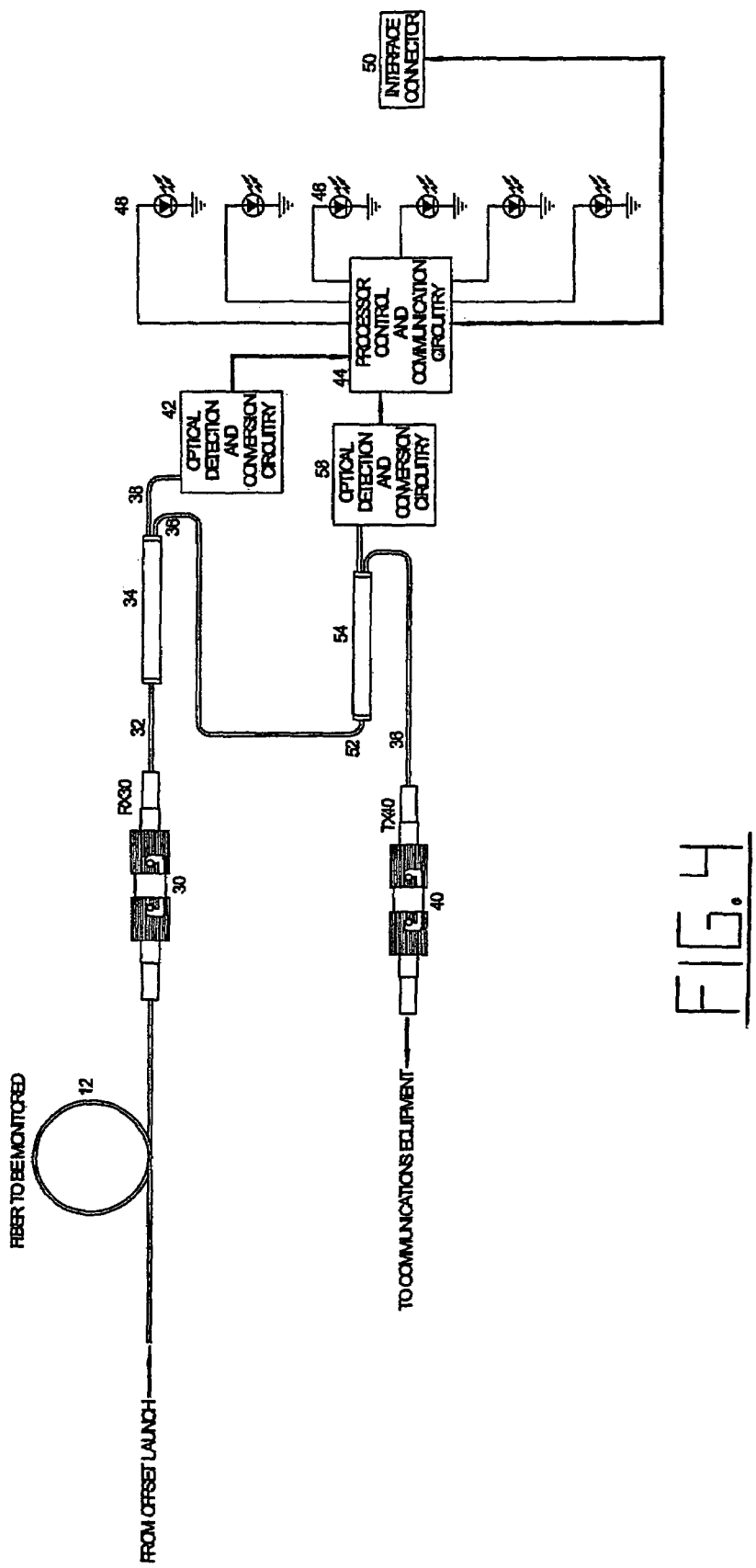
FIG. 4 is a block diagram of an alternative receiver portion of a system according to the present invention.

An enhanced variation of the detection scheme is shown in FIG. 4. The incoming optical signal is delivered, through connector 30 to the input 32 of the high order mode coupler 34 where the high order mode power distribution is sampled. The output 36 of the high order mode coupler 34 is then transmitted to the input port 52 of a bulk optics coupler 54. The bulk optics coupler is insensitive to modal power distribution and is used to sample a portion of the total optical signal. The sampled output of the bulk optics connecter 54 is delivered from output port 56 to a second detector circuit 58 where the absolute throughput power is calculated from the fixed ratio sample. This establishes an absolute power baseline that is compared to the high order mode sampling in the microprocessor and communications module 44. The microprocessor then compares the response in the two channels and is able to calculate any power change as well as changes in modal power distribution. Excessive power change levels produce an alarm indication at LED 60, and an alarm signal is sent to connector 50 This provides more information on fiber disturbances as a significant change in both channels could indicate a problem with the laser or fiber path while a transient and steady state change in the high order mode power distribution only would provide a strong indication of an intrusion attempt.

Thus, fundamental to the arrangement herein is the setting up of an under-filled, non-uniform mode field power distribution in the multimode optical fiber. A non-uniform high order mode field can be set up in a multimode fiber by illumination the end of the fiber with a non-divergent source of light that is offset from the center of the optical fiber core. This can be accomplished, as described before, by a using a laser, optical lenses and positioning mechanics or more simply by launching a laser into a single mode fiber and concatenating the single mode fiber to a multi mode fiber with a fixed offset. This is referred to as a Mode Conditioning Pigtail (MCP).

For typical multimode fibers with either a 50 or 62.5 micron core, the single mode fiber, with a core size of approximately 10 microns, is spliced to the multimode fiber with a micron center-to-center offset which is optimized for maximum sensitivity (typically 5 to 20 micron offset). The high order mode coupler can be made by a cladding-to-cladding fusion while measuring the tap-coupling ratio during the fusing process using an offset launch source as described.

Figure 5:
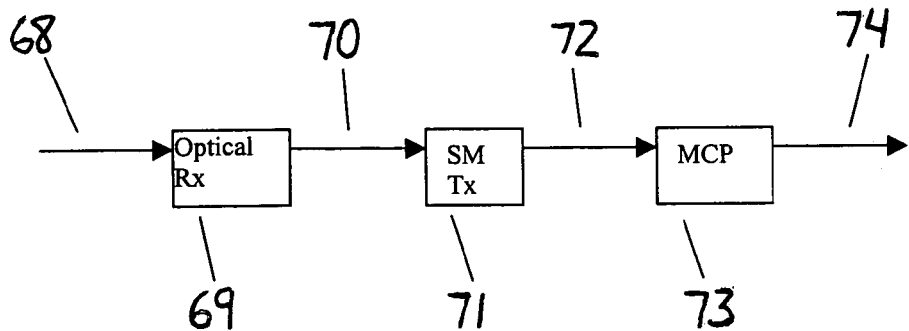
FIG. 5 is a block diagram of an Rx/Tx Translator for use in an arrangement as described above and shown in more detail in FIG. 6.
Figure 6:
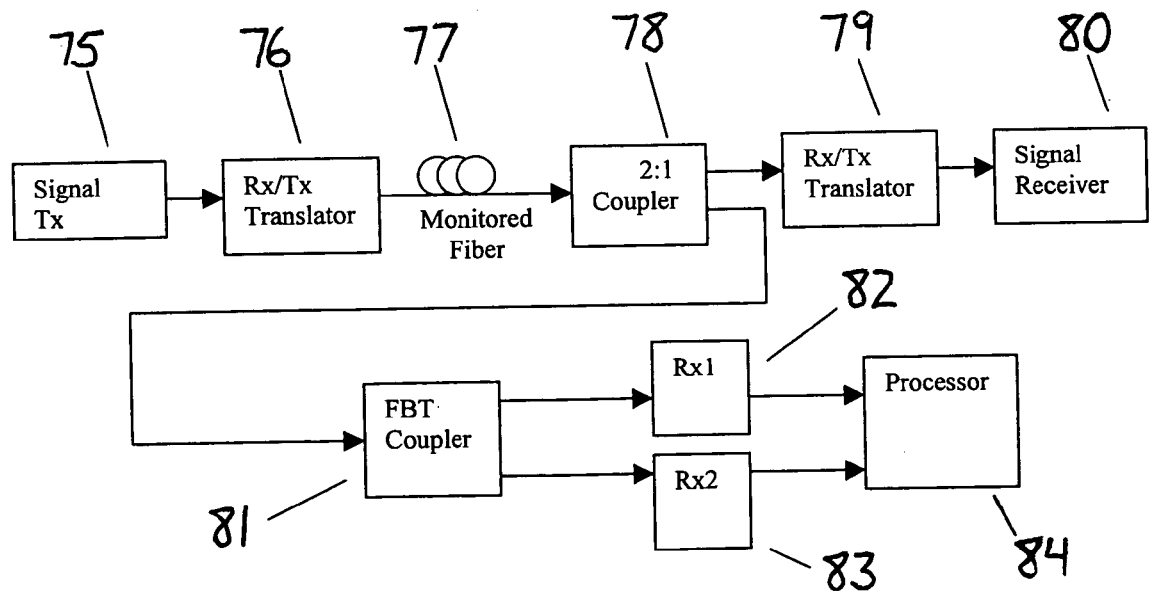
FIG. 6 is a block diagram of a preferred embodiment of this invention.

Turning now to the embodiment shown in FIGS. 5 and 6, central to this arrangement is an Rx/Tx Translator (RTT). Light enters the RTT through a multimode fiber 68 and feeds an optical receiver 69. This receiver converts the signal intelligence, such as modulation or data stream, to an electrical signal carried by an electrical conductor 70. This electrical signal is used to drive an optical transmitter 71 coupled to a single mode optical fiber 72. This feeds the mode conditioning patch-cord or pigtail 73 as described above, which launches this conditioned optical signal onto the multimode optical fiber 74 to be monitored.

Specifically, the improvements of this invention over prior art include the following. This invention utilizes one or more Rx/Tx Translators, which acts to modify the incoming signal by changing the wavelength and/or launch conditions which allows an optimum launch condition and wavelength to monitor what would otherwise be a non-optimized system. This invention also utilizes dual receivers Rx1 and Rx2 in order to monitor offset launched intrusion sensing light in addition to total laser and non-intrusive system stability.

In this arrangement, light launched from an optical source 75 (such as those found in a MM Gigabit Ethernet system) enters the RTT and is detected and converted to an electrical signal. Here, since the transmitter 71 is electrically rather than optically tied to the original signal, both network source wavelength and launch condition can be converted and optimized for fiber monitoring. This allows a system such as, but not limited to, 850 nm overfilled multimode to be converted to 1550 nm offset launch. A similar function of re-optimizing the launch could, in some circumstances, be performed optically and without an electrical link. An additional embodiment describes the signal delivery to the RTT by means other than optical cable, including, but not limited to coax cable. This would allow a non-optical network to connect to a protected optical network for a portion of the installation. An example is an electrical network in a secure facility being launched onto a protected optical cable for a long distance connection such as connecting buildings in a campus.

In the preferred embodiment of this invention as shown in FIG. 3, light from the intelligence source 75 enters the RTT 76 as above. This is launched at an offset launch into the multimode monitored fiber 77. At the receiving end, the light enters a modally symmetrical coupler 78, which directs similar signals to both a second RTT 79 and the asymmetrical coupler 81 such as, but not limited to, a fused biconic tap coupler as described hereinbefore. In the RTT 79, which operates similarly to the RTT of FIG. 2, the signal is symmetrically converted back to the format required for the transmission system from the intelligent source 75 and the signal is transmitted to a receiver 80. The RTT 79 is optional and unnecessary if the received light is compatible with the Signal Receiver 80, in which case the signal would go directly to that Signal Receiver 80, which represents the end user's data receiver.

The asymmetrically tapped coupler 81, which is preferably a fused biconic taper coupler and may have a ratio such as a 90:10 ratio, is capable of separating offset propagation modes from the bulk optical launch distribution by stripping off a small portion of the higher order modes which is transmitted to a receiver RX2 83. Handling of the fiber cable causes a local mechanical disturbance to the fiber. This mechanical disturbance, while not introducing detectable macro or micro bending losses, causes the power distribution in the mode pattern to change. This results in a change of the coupling efficiency of the high order mode coupler and a variation in the optical power at the output port feeding Rx2 83 which detects intrusions. The resultant optical signal is proportional in amplitude to the disturbing forces. The bulk optical signal, typically from the larger % tap ratio leg of the asymmetrical coupler, feeds RX1 82, and monitors non-intrusion affected light.

The other output of the two receivers is connected to a processor 84 where the absolute throughput power is calculated from the sum of the two receivers. This establishes an absolute power baseline that is compared to the higher order mode signal. The processor then compares the response in the two channels and is able to calculate any power change as well as changes indicative of an intrusion or fiber handling. This comparison can be performed in the digital domain including use of equipment such as, but not limited to a computer, or the analog domain using circuitry such as, but not limited to, a differential amplifier. This provides more information on fiber disturbances as a significant change in both channels could indicate a problem with the laser or fiber path while a transient and steady state change in the modal distribution only would provide a strong indication of an intrusion attempt.

In order to provide security beyond merely the alarm condition, an optical shutter or switch, in one embodiment, is inserted into the optical signal path such that an intrusion alarm can:

Interrupt the flow of data;

Re-route the data over a spare fiber; or

Introduce bad data or misinformation onto the fiber, foiling an intruder.

Yet further, backup fibers can be monitored with additional channels of the security system such that when data is re-routed as above, the data is re-routed to a fiber which is also already secured.

While specific embodiments of the invention have been described in the foregoing, these are presented by way of example only. other embodiments are possible within the spirit and scope of the present invention. In particular, it is to be understood that elements of the system such as the detector and conversion circuit and the microprocessor and communications module may be replaced with any other element or elements for performing similar functions in the system. The invention is to be considered limited solely by the scope of the appended claims

The invention claimed is:

1. A method for monitoring movement of a fiber indicative of potential intrusion in an optical transmission system having an optical transmitter for transmitting intelligence from a source through the system at a first optical wavelength and an optical receiver for receiving the intelligence at the first optical wavelength, the method comprising:

providing an optical fiber for monitoring having first and second ends;

detecting movement of the fiber along the length thereof by:

injecting light pulses into one end of the optical fiber;

detecting at a position on the fiber a series of received light signals which have been transmitted along the fiber as a result of the injected light pulses;

comparing at least some of the received light signals relative to data obtained from previously received ones of the received light signals to detect changes in the received light signals relative to the previously received light signals;

analyzing the changes to determine any changes which are indicative of movement of the optical fiber causing at a portion thereof along the length thereof;

and generating an alarm in response to the detection of any such changes which are indicative of movement;

wherein there is provided a translator which receives the intelligence from the optical transmitter at the first wavelength and which translates the signal into the light pulses which are transmitted along the optical fiber at a second wavelength which is different from the first wavelength and is optimized for injection into the optical fiber such that the received light signals are optimized for monitoring of movement of the optical fiber.

2. The method according to claim 1 wherein the translator comprises a part of an intrusion system which includes the optical fiber which is selected to receive the light pulses from the translator and not from the transmitter of the optical transmission system.

3. The method according to claim 2 wherein the translator changes fiber type between single mode and multimode.

4. The method according to claim 2 wherein the translator changes fiber core diameter.

5. The method according to claim 1 wherein the translator comprises an optical receiver for receiving the intelligence from an optical fiber and an optical transmitter for transmitting the translated optical signals.

6. The method according to claim 5 wherein the optical receiver is arranged to provide an electrical output containing the data and the optical transmitter is arranged to generate the translated optical signals from the electrical output.

7. A method for monitoring movement of a fiber indicative of potential intrusion in an optical transmission system having an optical transmitter for transmitting intelligence from a source through the system at a first optical wavelength and an optical receiver for receiving the intelligence at the first optical wavelength, the method comprising:

providing an optical fiber for monitoring having a first and second ends;

detecting movement of the fiber along the length thereof by:

injecting light pulses into one end of the optical fiber;

detecting at a position on the fiber a series of received light signals which have been transmitted along the fiber as a result of the injected light pulses;

comparing at least some of the received light signals relative to data obtained from previously received ones of the received light signals to detect changes in the received light signals relative to the previously received light signals;

analyzing the changes to determine any changes which are indicative of movement of the optical fiber causing at a portion thereof along the length thereof;

and generating an alarm in response to the detection of any such changes which are indicative of movement;

wherein there is provided a translator which receives the intelligence from the optical transmitter at the first wavelength and which translates the intelligence into the light pulses which are transmitted along the optical fiber at a second wavelength which is different from the first wavelength and is optimized for injection into the optical fiber such that the received light signals are optimized for monitoring of movement of the optical fiber; and wherein the fiber to be monitored is a multi-mode fiber and the translator provides an offset launch of the signals which are offset from the center of a core of the multi-mode optical fiber so as to establish a non-uniform mode field power distribution in the optical fiber.

8. The method according to claim 7 wherein the received light pulses are obtained by capturing a portion of higher order signal modes arriving at a distal end of the optical fiber and wherein the captured portion is monitored for transient changes in the mode field power distribution that are characteristic of optical fiber handling.

9. A method according to claim 7 wherein the translator includes a single mode fiber which is coupled to the multi-mode optical fiber at the proximal end at a position which is offset from the center of the core.

10. A method according to claim 7 wherein the light pulses are non-divergent.

11. A method according to claim 7 wherein the light pulses establishes a narrow spectral width, under-filled, non-uniform mode field power distribution in the multimode optical fiber.

12. A method according to claim 7 wherein the higher order signal modes at the distal end are captured by a tap coupler which captures a portion only of the light signal arriving at the distal end of the cable, the portion containing only higher order signal modes, and including monitoring over time a value of the optical power of the portion for transient changes in the optical power of the portion; and generating the alarm in response to detection of said transient changes that are characteristic of handling of the fiber.

13. A method according to claim 12 wherein the tap coupler taps off a small portion of the higher order modes leaving a larger separate signal forming a bulk optical launch distribution.

14. A method according to claim 13 wherein the larger separate signal is delivered to a detector circuit where an absolute throughput power of the launched light signal is calculated therefrom.

15. A method according to claim 14 including comparing the optical power of the portion and the absolute throughput power of the larger separate signal and calculating any power change as well as changes in modal power distribution and activating the alarm in response to excessive power change levels.

16. A method according to claim 15 including using a significant change in the optical power of the portion and the absolute throughput power of the larger separate signal to indicate a problem with the source or the optical fiber; and using a transient and steady state change in the optical power of the portion only to provide an indication of an intrusion attempt.

17. A method for monitoring movement of a fiber indicative of potential intrusion in an optical transmission system having an optical transmitter for transmitting intelligence from a source through the system and an optical receiver for receiving the intelligence, the method comprising:
providing an optical fiber for monitoring having first and second ends;
detecting movement of the fiber along the length thereof by:
injecting light pulses into one end of the optical fiber;
detecting at a position on the fiber a series of received light signals which have been transmitted along the fiber as a result of the injected light pulses;
comparing at least some of the received light signals relative to data obtained from previously received ones of the received light signals to detect changes in the received light signals relative to the previously received light signals;
analyzing the changes to determine any changes which are indicative of movement of the optical fiber causing at a portion thereof along the length thereof;
and generating an alarm in response to the detection of any such changes which are indicative of movement;
wherein there is provided a translator which receives the intelligence from the optical transmitter and which translates the intelligence into the light pulses which are transmitted along the optical fiber and are optimized for monitoring of movement of the optical fiber; and
wherein there is provided a second translator at the second end which is symmetrical to the translator and translates the received light pulses signals back to a signal compatible with the optical receiver.

18. The method according to claim 17 wherein the translator and the second translator form a system for adding to an existing network including the optical fiber to be monitored so as to optimize the existing network for monitoring of the fiber.

* * * * *